United States Patent
Chen

(10) Patent No.: US 11,923,156 B2
(45) Date of Patent: Mar. 5, 2024

(54) BACKLIGHT MODULE AND LIGHTING KEYBOARD

(71) Applicant: DARFON ELECTRONICS CORP., Taoyuan (TW)

(72) Inventor: Chao-Yu Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 56 days.

(21) Appl. No.: 17/873,128

(22) Filed: Jul. 25, 2022

(65) Prior Publication Data
US 2023/0067471 A1 Mar. 2, 2023

(30) Foreign Application Priority Data
Aug. 25, 2021 (TW) .................................. 110131417

(51) Int. Cl.
*F21V 8/00* (2006.01)
*H01H 13/83* (2006.01)

(52) U.S. Cl.
CPC ........... *H01H 13/83* (2013.01); *G02B 6/0021* (2013.01); *G02B 6/0025* (2013.01); *G02B 6/0028* (2013.01); *G02B 6/0036* (2013.01)

(58) Field of Classification Search
CPC .... H01H 13/83; G02B 6/0021; G02B 6/0025; G02B 6/0028; G02B 6/0036
See application file for complete search history.

(56) References Cited

U.S. PATENT DOCUMENTS

| 6,743,993 | B1 | 6/2004 | Clark |
| 9,040,856 | B2 | 5/2015 | Chen |
| 9,214,301 | B2 | 12/2015 | Chen |
| 9,299,515 | B2 | 3/2016 | Chen |

(Continued)

FOREIGN PATENT DOCUMENTS

| CN | 105321758 A | * | 2/2016 |
| CN | 106783308 A | | 5/2017 |

(Continued)

OTHER PUBLICATIONS

English translation of ILiang CN-105321758-A, published Feb. 2016 (Year: 2016).*

(Continued)

*Primary Examiner* — Evan P Dzierzynski
(74) *Attorney, Agent, or Firm* — Winston Hsu

(57) ABSTRACT

A back light module is applied to a lighting keyboard with a plurality of keyswitches and includes a lighting unit, a light guide plate, a light penetrating membrane, a light calibration layer and an adhering component. The light guide plate has an opening used to accommodate the lighting unit. The light penetrating membrane is disposed on the light guide plate. The light calibration layer is disposed on the light penetrating membrane and has a second contour. The adhering component is disposed between the light guide plate and the light penetrating membrane, and has a first contour greater than the second contour. The adhering component includes a front region, a rear region and a hollow region. The front region is covered by the light calibration layer. The rear region is partly covered or not covered by the light calibration layer. The hollow region corresponds to and is larger than the opening.

15 Claims, 5 Drawing Sheets

(56) References Cited

U.S. PATENT DOCUMENTS

| | | | |
|---|---|---|---|
| 10,276,327 B2 | 4/2019 | Chen | |
| 10,586,664 B2 | 3/2020 | Yeh | |
| 11,036,306 B2 | 6/2021 | Cheng | |
| 11,175,444 B1 * | 11/2021 | Pan | G02B 6/0088 |
| 11,257,638 B2 | 2/2022 | Liang | |
| 11,371,676 B2 | 6/2022 | Huang | |
| 11,409,373 B2 | 8/2022 | Cheng | |
| 11,443,907 B2 | 9/2022 | Ho | |
| 11,515,107 B2 | 11/2022 | Chen | |
| 11,538,641 B2 | 12/2022 | Liang | |
| 2011/0037730 A1 | 2/2011 | Wang | |
| 2017/0352504 A1 | 12/2017 | Chen | |
| 2018/0106956 A1 * | 4/2018 | Wang | G02B 6/0068 |
| 2019/0027326 A1 | 1/2019 | Tsai | |
| 2019/0369744 A1 | 12/2019 | Wu | |
| 2020/0402748 A1 | 12/2020 | Cheng | |
| 2021/0082642 A1 * | 3/2021 | Ho | H01H 13/705 |

FOREIGN PATENT DOCUMENTS

| | | | |
|---|---|---|---|
| CN | 110335775 A | | 10/2019 |
| CN | 113632249 A | | 11/2021 |
| JP | 2019-139728 | | 8/2019 |
| TW | M334393 | | 6/2008 |
| TW | M395202 U1 | | 12/2010 |
| TW | I527075 B | | 3/2016 |
| TW | I598918 B | * | 8/2016 |
| TW | I604484 B | | 11/2017 |
| TW | 201824318 A | | 7/2018 |
| TW | I632577 B | | 8/2018 |
| TW | I725894 | | 4/2021 |
| TW | I760181 B | | 4/2022 |

OTHER PUBLICATIONS

English translation of Yeh TW-I598918-B, published Aug. 2016 (Year: 2016).*

Huang, the specification, including the claims, and drawings in the U.S. Appl. No. 18/127,667, filed Mar. 29, 2023.

Liu, the specification, including the claims, and drawings in the U.S. Appl. No. 18/297,020, filed Apr. 7, 2023.

Liu, the specification, including the claims, and drawings in the U.S. Appl. No. 18/128,235, filed Mar. 30, 2023.

Chen, the specification, including the claims, and drawings in the U.S. Appl. No. 18/128,261, filed Mar. 30, 2023.

Huang, the specification, including the claims, and drawings in the U.S. Appl. No. 18/330,342, filed Jun. 6, 2023.

* cited by examiner

BACKLIGHT MODULE AND LIGHTING KEYBOARD

BACKGROUND OF THE INVENTION

1. Field of the Invention

The present invention relates to a back light module and a lighting keyboard, and more particularly, to a back light module and a lighting keyboard providing preferred illumination uniformity.

2. Description of the Prior Art

Please refer to FIG. 1 and FIG. 2. FIG. 1 is a sectional view of a light keyboard of the prior art. FIG. 2 is a diagram of a part of the light keyboard of the prior art. A conventional lighting keyboard includes a substrate 100, a circuit board 102, a light guide plate 103, a keycap 104, a lifting mechanism 105 and a resilient recovering component 106. The board 102 is disposed on the substrate 100, and has a plurality of switches 107 corresponding to a plurality of keycaps 104. The lifting mechanism 105 is disposed on the substrate 100 and used to support the keycap 104, so that the keycap 104 can be moved relative to the substrate 100. The resilient recovering component 106 is disposed between the keycap 104 and the substrate 100, and provides a resilient covering force to move the keycap 104 back to an initial position. The light guide plate 103 has an opening 108, and the lighting unit 109 is disposed inside the opening 108 and emits an illumination beam toward the light guide plate 103. The keycap 104 has a symbol. The illumination beam emitted by the lighting unit 109 is projected onto the symbols on a plurality of keycaps 104 through the microprisms of the light guide plate 103. The light penetrating membrane 111 has a plurality of sheltering layers 112 used to shelter light around the keycap 104 for preventing or decreasing halo. A dimension of the light guide plate 103 is similar to a dimension of the light penetrating membrane 111, and the adhering component 113 (such as hydrogel) is set between the light guide plate 103 and the light penetrating membrane 111. In addition, the hydrogel 113 is smeared around the opening 108. The hydrogel 113 has a light guiding property, and the symbol on the keycap 104 of the keyswitch is too bright if the keyswitch is disposed right above a contour of the hydrogel 113. Thus, the light penetrating membrane 111 has a black ink layer 114, which is defined as the sheltering layer 112, disposed on position corresponding to the hydrogel 113. The black ink layer 114 weakens the illumination beam transmitted from the hydrogel 113 toward the keycap 104. The dimension of the black ink layer 114 is greater than the dimension of the hydrogel 113, and the black ink layer 114 is fully overlapped with the hydrogel 113. The black ink layer 114 can prevent the symbol on the keycap 104 from high illumination intensity, but also over-decrease the illumination intensity of the symbol on the keycap 104.

SUMMARY OF THE INVENTION

The present invention provides a back light module and a lighting keyboard providing preferred illumination uniformity for solving above drawbacks.

According to the claimed invention, a lighting keyboard includes a back light module and a plurality of keyswitches. The back light module includes a lighting unit, a light guide plate, a light penetrating membrane, a light calibration layer and an adhering component. The light guide plate has an opening used to accommodate the lighting unit. The light penetrating membrane is disposed on the light guide plate. The light calibration layer is disposed on the light penetrating membrane and having a second contour. The adhering component has a first contour greater than the second contour, and the adhering component is disposed between the light guide plate and the light penetrating membrane. The adhering component includes a front region, a rear region and a hollow region. The front region is fully covered by the light calibration layer. The rear region is partly covered or not covered by the light calibration layer. A position of the hollow region corresponds to a position of the opening and a size of the hollow region is greater than a size of the opening. The plurality of keyswitches is disposed on the back light module.

According to the claimed invention, a back light module is applied to a lighting keyboard and includes a lighting unit, a light guide plate, a light penetrating membrane, a light calibration layer and an adhering component. The light guide plate has an opening used to accommodate the lighting unit. The light penetrating membrane is disposed on the light guide plate. The light calibration layer is disposed on the light penetrating membrane and having a second contour. The adhering component has a first contour greater than the second contour, and the adhering component is disposed between the light guide plate and the light penetrating membrane. The adhering component includes a front region, a rear region and a hollow region. The front region is fully covered by the light calibration layer. The rear region is partly covered or not covered by the light calibration layer. A position of the hollow region corresponds to a position of the opening and a size of the hollow region is greater than a size of the opening.

The back light module and the lighting keyboard of the present invention can utilize a light guiding property of the adhering component to be an auxiliary illumination source, so that the symbol of the keyswitch above the lighting unit can have preferred illumination intensity. The front region of the adhering component can be fully covered by the light calibration layer, and the rear region of the adhering component can be partly covered by the light calibration layer, or the rear region of the adhering component cannot be covered by the light calibration layer. Therefore, a front side and a rear side of the keycap of the lighting keyswitch can have the preferred illumination intensity no matter where the lighting unit is in the light guiding module, and the lighting keyswitch can provide the preferred illumination uniformity and halo continuity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
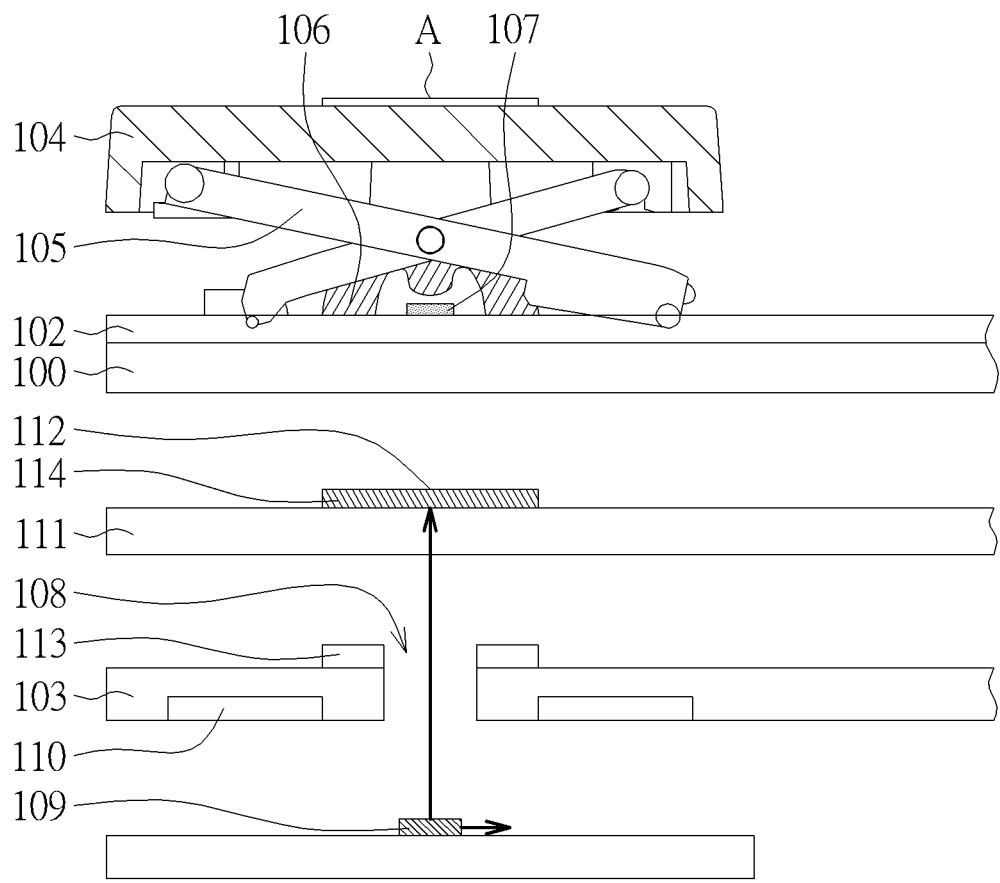
FIG. 1 is a sectional view of a light keyboard of the prior art.
Figure 2:
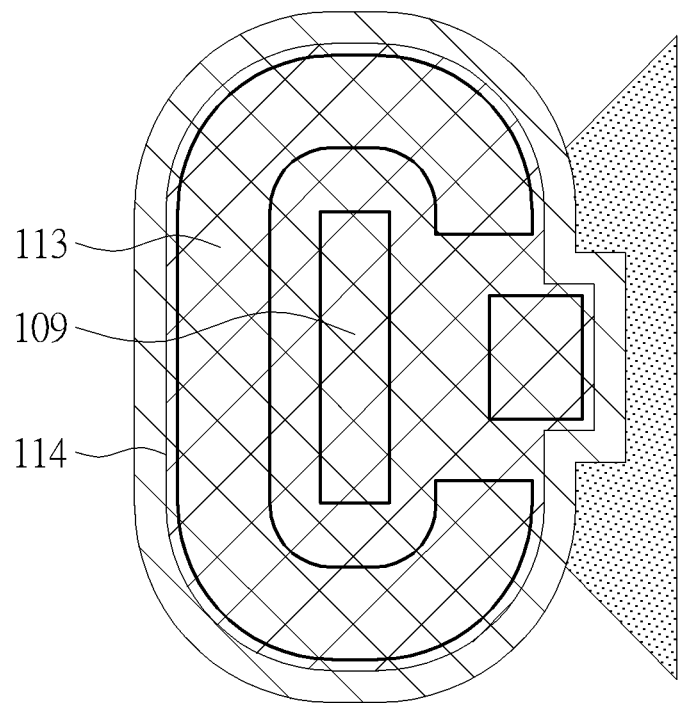
FIG. 2 is a diagram of a part of the light keyboard of the prior art.
Figure 3:
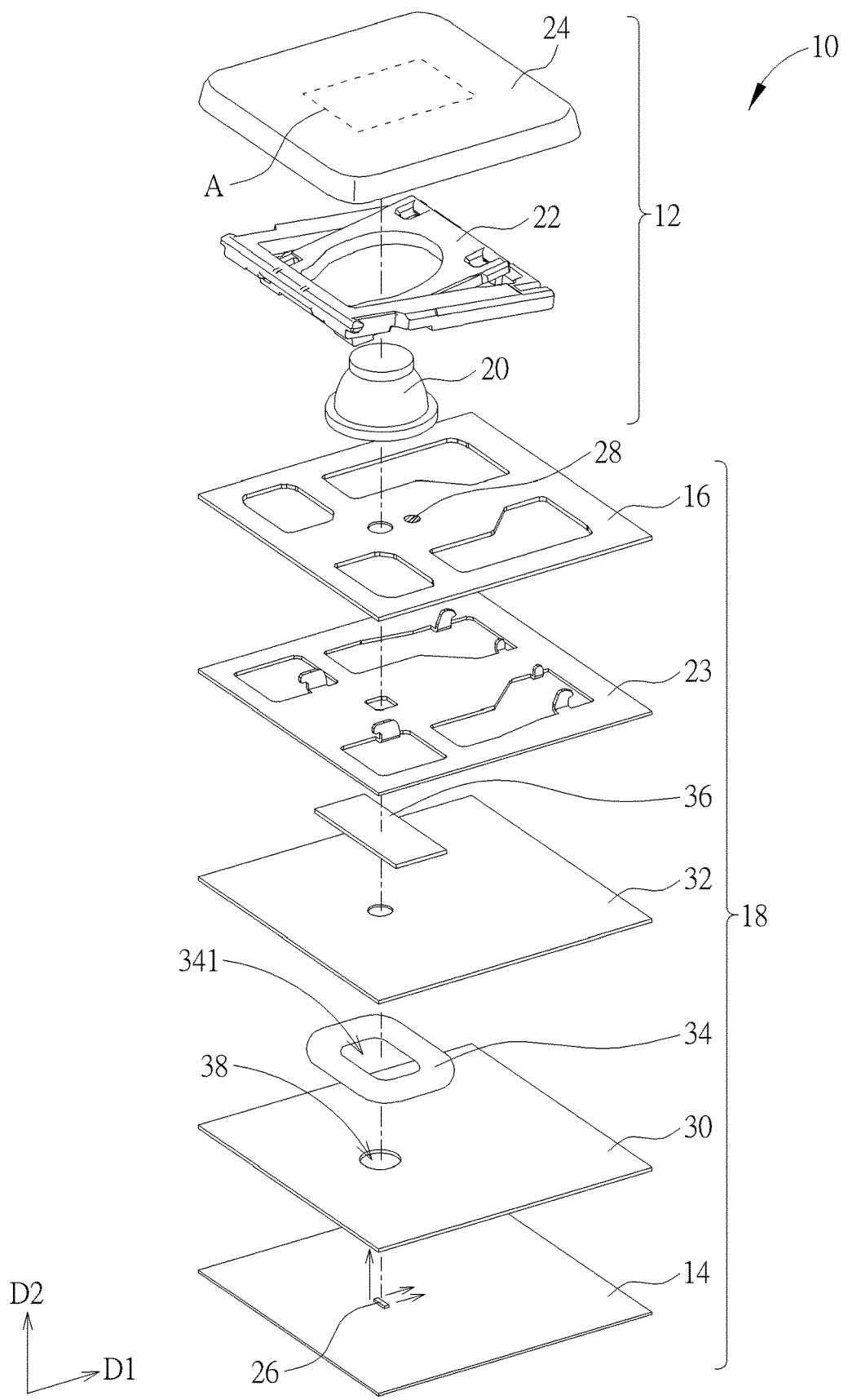
FIG. 3 is an exploded diagram of a part of a lighting keyboard according to an embodiment of the present invention.
Figure 4:
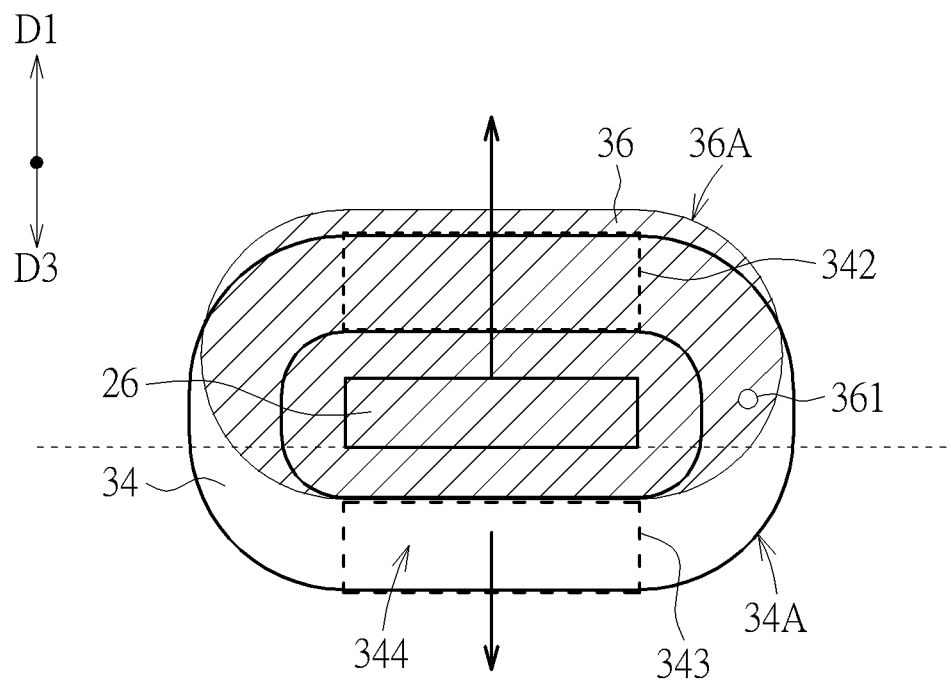
FIG. 4 is a diagram of relation between a lighting unit, a light calibration layer and an adhering component according to the embodiment of the present invention.

Please refer to FIG. 3 and FIG. 4. FIG. 3 is an exploded diagram of a part of a lighting keyboard 10 according to an embodiment of the present invention. FIG. 4 is a diagram of relation between a lighting unit 26, a light calibration layer 36 and an adhering component 34 according to the embodiment of the present invention. The lighting keyboard 10 can include a plurality of keyswitches 12. A number and arrangement of the keyswitch 12 are designed in accordance with a language family of the lighting keyboard 10, and a detailed description is omitted herein for simplicity.

The lighting keyboard 10 can include a light source circuit board 14, a thin film circuit board 16, a back light module, a resilient recovering component 20, a lift supporting mechanism 22, a substrate 23 and a keycap 24. The lighting unit 26 can be disposed on the light source circuit board 14. The thin film circuit board 16 can have a plurality of switches 28. The light source circuit board 14, the thin film circuit board 16 and the substrate 23 are overlapped with each other. The lift supporting mechanism 22 can support the keycap 24 so that the keycap 24 can be moved relative to the switch 28. The lift supporting mechanism 22 can be disposed on the substrate 23.

The back light module 18 can include a light guide plate 30, a light penetrating membrane 32, the adhering component 34, the lighting unit 26 and the light calibration layer 36. The light guide plate 30 can have an opening 38 used to accommodate the lighting unit 26. The keyswitch 12 can be disposed above the lighting unit 26. The lighting unit 26 can emit an illumination beam toward the light guide plate 30 in a first direction D1, and the illumination beam can be transmitted to the plurality of keycaps 24 in a second direction D2 via micro-prisms (which are not shown in the figures) of the light guide plate 30. The first direction D1 can be substantially perpendicular to the second direction D2. The light penetrating membrane 32 can cover above the light guide plate 30, and a dimension of the light penetrating membrane 32 can be similar to a dimension of the light guide plate 30. The adhering component 34 can be disposed between the light guide plate 30 and the light penetrating membrane 32 for adhesion. The adhering component 34 can include a hollow region 341. A position of the hollow region 341 can correspond to a position of the opening 38, and a size of the hollow region 341 can be greater than a size of the opening 38.

In the present invention, the adhering component 34 can be made by light transmission and light guide material, such as hydrogel, so that a part of the illumination beam can be projected onto a symbol A on the keycap 24 in the second direction D2 through the adhering component 34. As shown in FIG. 4, the adhering component 34 can have a first contour 34A, and the light calibration layer 36 can have a second contour 36A smaller than the first contour 34A. The adhering component 34 can include a front region 342 distributed along the first direction D1 of the lighting unit 26, and further include a rear region 343 distributed along a third direction D3 of the lighting unit 26. The adhering component 34 is fully or approximately overlapped with the light calibration layer 36 over the front region 342. The light calibration layer 36 is not overlapped with the rear region 343 of the adhering component 34. The adhering component 34 can provide an unexposed region 344, and the illumination beam can be projected onto the symbol A in the second direction 2 via the unexposed region 344.

The light calibration layer 36 can be a dark color coating layer with a light sheltering function, such as a black ink, which can shelter parts of the illumination beam transmitted in the second direction D2 and therefore still allow some part of the illumination beam transmitted in the second direction D2; further, the light calibration layer 36 can be a light color coating layer with a light partially penetrating function, such as a white ink, and parts of the illumination beam can be transmitted toward the keyswitch through the white ink. Besides, the light calibration layer 36 may include one or plural light penetrating dots 361 used to adjust a quantity of the illumination beam projected onto the keycap 24. A material, a dimension, a thickness and a shape of the light calibration layer 36 are not limited to the embodiment shown in the figures, and depend on a design demand. The keycap 24 of one of the plurality of keyswitches 12 can vary an overlapped degree between the light calibration layer 36 and the adhering component 34 to adjust illumination uniformity of the symbol A.

Figure 5:
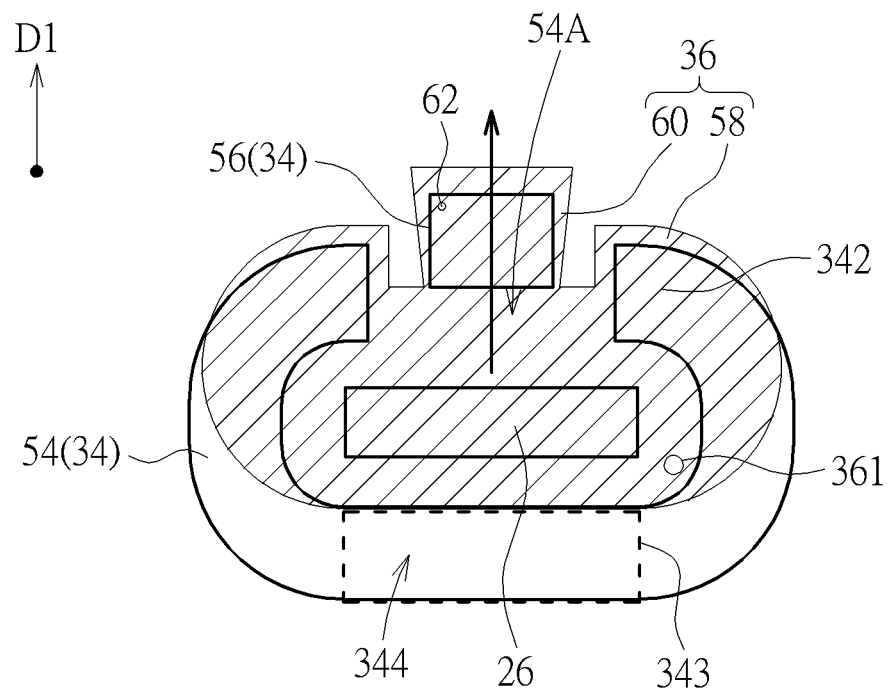
FIG. 5 is a diagram of relation between the lighting unit, the light calibration layer and the adhering component according to another embodiment of the present invention.

Please refer to FIG. 5. FIG. 5 is a diagram of relation between the lighting unit 26, the light calibration layer 36 and the adhering component 34 according to another embodiment of the present invention. In this embodiment, the adhering component 34 can include a first adhesion body 54 and a second adhesion body 56. The first adhesion body can be a C-typed form. The second adhesion body 56 can be a rectangle form smaller than the C-typed form. The illumination beam emitted by the lighting unit 26 can be transmitted toward a hole 54A formed on the first adhesion body 54, such as transmitted in the first direction D1. The second adhesion body 56 can be disposed adjacent to the hole 54A of the first adhesion body 54. The second adhesion body 56 can be fully covered by the light calibration layer 36. The light calibration layer 36 can include a main portion 58 and a protruding portion 60. The protruding portion 60 can be a trapezoid form and used to fully cover the second adhesion body 56.

In addition, the light calibration layer 36 can optionally include one or plural light penetrating holes 62. The light penetrating hole 62 can be formed on the protruding portion 60 of the light calibration layer 36, and used to slightly increase an illumination intensity of the symbol A on the keycap 24. In other possible embodiments, the light penetrating hole 62 may be formed on the main portion 58 of the light calibration layer 36, and a position, a size and distribution of the light penetrating hole 62 can depend on the design demand.

Figure 6:
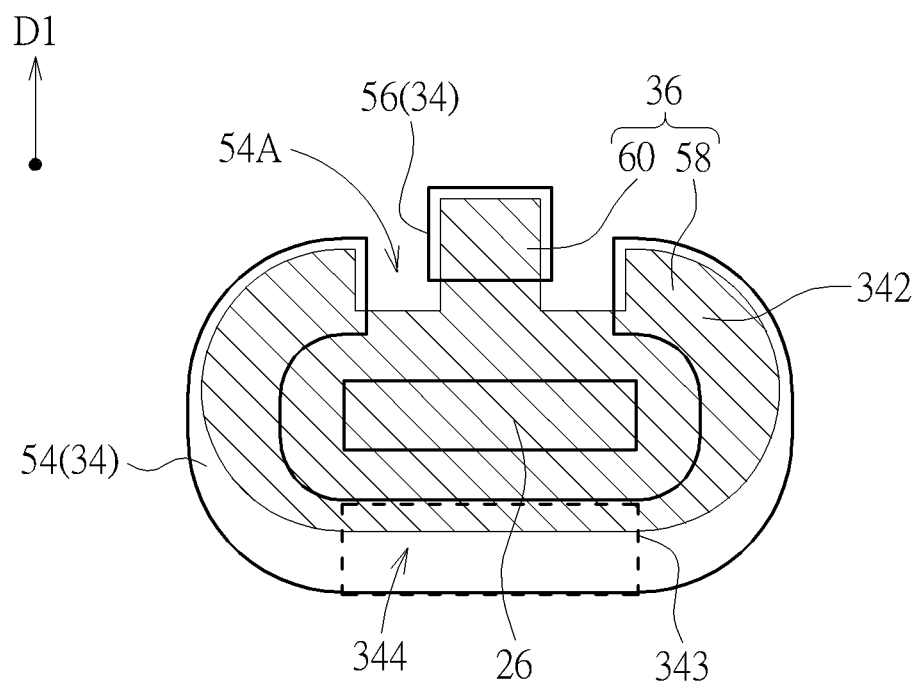
FIG. 6 is a diagram of relation between the lighting unit, the light calibration layer and the adhering component according to another embodiment of the present invention.

Please refer to FIG. 6. FIG. 6 is a diagram of relation between the lighting unit 26, the light calibration layer 36 and the adhering component 34 according to another embodiment of the present invention. In this embodiment, elements having the same numerals as ones of the foresaid embodiment have the same positions and functions, and the detailed description is omitted herein for simplicity. The adhering component 34 of the embodiment can have the front region 342 approximately overlapped with the light calibration layer 36; however, the light calibration layer 36 may slightly protrude from the adhering component 34 in the first direction D1. The adhering component 34 can have the rear region 343 partly overlapped with the light calibration layer 36, and further have the unexposed region 344 not overlapped with the light calibration layer 36. The illumination beam can be transmitted toward the symbol A in the second direction D2 through the unexposed region 344 of the adhering component 34. The adhering component 34 of the embodiment can have the first adhesion body 54 and the second adhesion body 56. The first adhesion body can be the C-typed form, and the second adhesion body 56 can be the rectangle form smaller than the C-typed form. The illumination beam emitted by the lighting unit 26 can be transmitted toward the hole 54A of the first adhesion body 54. The second adhesion body 56 can be disposed adjacent to the hole 54A of the first adhesion body 54. The main portion 58 of the light calibration layer 36 can be smaller than the first adhesion body 54 of the adhering component 34. The protruding portion 60 of the light calibration layer 36 can be the rectangle form and not fully overlapped with the second adhesion body 56 of the adhering component 34.

In conclusion, the back light module and the lighting keyboard of the present invention can utilize a light guiding property of the adhering component to be an auxiliary illumination source, so that the symbol of the keyswitch above the lighting unit can have preferred illumination intensity. The front region of the adhering component can be fully covered by the light calibration layer, and the rear region of the adhering component can be partly covered by the light calibration layer, or the rear region of the adhering component cannot be covered by the light calibration layer. Therefore, a front side and a rear side of the keycap of the lighting keyswitch can have the preferred illumination intensity no matter where the lighting unit is in the light guiding module, and the lighting keyswitch can provide the preferred illumination uniformity and halo continuity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting keyboard comprising:
    a back light module comprising:
        a lighting unit;
        a light guide plate having an opening used to accommodate the lighting unit;
        a light penetrating membrane disposed on the light guide plate;
        a light calibration layer disposed on the light penetrating membrane and having a second contour; and
        an adhering component having a first contour greater than the second contour, the adhering component being disposed between the light guide plate and the light penetrating membrane, the adhering component comprising:
            a front region fully covered by the light calibration layer;
            a rear region partly covered or not covered by the light calibration layer; and
            a hollow region, a position of the hollow region corresponding to a position of the opening and a size of the hollow region being greater than a size of the opening; and
    a plurality of keyswitches disposed on the back light module.

2. The lighting keyboard of claim 1, wherein each of the plurality of keyswitches is disposed above the lighting unit, and an illumination beam emitted by the lighting unit is projected onto a symbol on the keyswitch through the adhering component.

3. The lighting keyboard of claim 1, wherein the light calibration layer is a dark color coating layer with a light sheltering function, or a light color coating layer with a light partially penetrating function.

4. The lighting keyboard of claim 1, wherein the light calibration layer comprises a plurality of light penetrating dots used to adjust a quantity of an illumination beam emitted by the lighting unit and projected onto the keyswitch.

5. The lighting keyboard of claim 1, wherein the adhering component further comprises a hole, and an illumination beam emitted by the lighting unit is transmitted toward the hole.

6. The lighting keyboard of claim 5, wherein the adhering component further comprises a first adhesion body and a second adhesion body, the first adhesion body is a C-typed form, the second adhesion body is a rectangle form and disposed adjacent to the hole.

7. The lighting keyboard of claim 6, wherein the second adhesion body is fully covered by the light calibration layer.

8. The lighting keyboard of claim 7, wherein the light calibration layer covering the second adhesion body is a trapezoid form.

9. A back light module applied to a lighting keyboard, the back light module comprising:
    a lighting unit;
    a light guide plate having an opening used to accommodate the lighting unit;
    a light penetrating membrane disposed on the light guide plate;
    a light calibration layer disposed on the light penetrating membrane and having a second contour; and
    an adhering component having a first contour greater than the second contour, the adhering component being disposed between the light guide plate and the light penetrating membrane, the adhering component comprising:
        a front region fully covered by the light calibration layer;
        a rear region partly covered or not covered by the light calibration layer; and
        a hollow region, a position of the hollow region corresponding to a position of the opening and a size of the hollow region being greater than a size of the opening.

10. The back light module of claim 9, wherein the light calibration layer is a dark color coating layer with a light sheltering function, or a light color coating layer with a light partially penetrating function.

11. The back light module of claim 9, wherein the light calibration layer comprises a plurality of light penetrating dots used to adjust a quantity of an illumination beam emitted by the lighting unit.

12. The back light module of claim 9, wherein the adhering component further comprises a hole, and an illumination beam emitted by the lighting unit passes through the hole.

13. The back light module of claim 12, wherein the adhering component further comprises a first adhesion body and a second adhesion body, the first adhesion body is a C-typed form, the second adhesion body is a rectangle form and disposed adjacent to the hole.

14. The back light module of claim 13, wherein the second adhesion body is fully covered by the light calibration layer.

15. The back light module of claim 14, wherein the light calibration layer covering the second adhesion body is a trapezoid form.

\* \* \* \* \*